United States Patent
Asai et al.

(10) Patent No.: US 11,014,514 B2
(45) Date of Patent: May 25, 2021

(54) VEHICLE SURROUNDINGS DISPLAY DEVICE

(71) Applicant: TOYOTA JIDOSHA KABUSHIKI KAISHA, Toyota (JP)

(72) Inventors: Goro Asai, Toyota (JP); Tomoaki Iida, Okazaki (JP); Kunihiro Sugihara, Nagakute (JP); Yuki Takahashi, Toyota (JP); Taichi Hasegawa, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/553,417

(22) Filed: Aug. 28, 2019

(65) Prior Publication Data

US 2020/0079307 A1 Mar. 12, 2020

(30) Foreign Application Priority Data

Sep. 6, 2018 (JP) .............................. JP2018-166770

(51) Int. Cl.
*B60R 16/033* (2006.01)
*B60R 1/00* (2006.01)
*H04N 5/232* (2006.01)
*B60R 11/04* (2006.01)
*B60R 11/00* (2006.01)
*B60R 11/02* (2006.01)

(52) U.S. Cl.
CPC .............. *B60R 16/033* (2013.01); *B60R 1/00* (2013.01); *H04N 5/232411* (2018.08); *B60R 11/0235* (2013.01); *B60R 11/04* (2013.01); *B60R 2011/0003* (2013.01); *B60R 2011/004* (2013.01); *B60R 2300/105* (2013.01); *B60R 2300/8046* (2013.01)

(58) Field of Classification Search
CPC ..... B60R 16/033; B60R 1/00; B60R 11/0235; B60R 11/04; B60R 2011/0003; B60R 2011/004; B60R 2300/105; B60R 2300/8046; H04N 5/232411
USPC ......................................................... 348/148
See application file for complete search history.

(56) References Cited

U.S. PATENT DOCUMENTS

| 6,670,883 | B1* | 12/2003 | Asakura | B60R 25/24 307/10.1 |
| 2008/0235527 | A1* | 9/2008 | Heller | G06F 1/3203 713/320 |
| 2010/0244557 | A1* | 9/2010 | Ito | F02N 11/0803 307/9.1 |
| 2012/0273289 | A1* | 11/2012 | Seymour | H04K 3/22 180/287 |
| 2017/0028921 | A1 | 2/2017 | Asai | |

(Continued)

FOREIGN PATENT DOCUMENTS

JP 2015202769 A 11/2015

*Primary Examiner* — Joseph G Ustaris
*Assistant Examiner* — Matthew David Kim
(74) *Attorney, Agent, or Firm* — Sughrue Mion, PLLC

(57) ABSTRACT

A vehicle surroundings display device includes an imaging device, a display device, and a controller is provided. The imaging device images a region toward a rear side of a vehicle and sideways from the vehicle. The display device is capable of displaying an image captured by the imaging device. The controller controls display of the display device, and selectively a normal active mode, a power-off active mode, a standby mode and a shut-down mode.

8 Claims, 9 Drawing Sheets

(56) References Cited

U.S. PATENT DOCUMENTS

| | | | | |
|---|---|---|---|---|
| 2017/0097505 A1* | 4/2017 | Takamatsu | ............. | B60K 37/00 |
| 2017/0318267 A1* | 11/2017 | Kim | ......................... | B60R 1/00 |
| 2018/0086268 A1 | 3/2018 | Kochiya | | |

* cited by examiner

VEHICLE SURROUNDINGS DISPLAY DEVICE

CROSS-REFERENCE TO RELATED APPLICATION

This application claims priority under 35 USC 119 from Japanese Patent application No. 2018-166770 filed on Sep. 6, 2018, the disclosure of which is incorporated by reference herein in its entirety.

BACKGROUND

Technical Field

The present disclosure relates to a vehicle surroundings display device.

Related Art

Japanese Patent Application Laid-Open (JP-A) No. 2015-202769 discloses an invention relating to an electronic mirror system for a vehicle. This electronic mirror system includes an imaging section, a display section, and a control section. The imaging section images sideways from the vehicle and toward the rear side of the vehicle so as to include at least part of the rear wheels of the vehicle. When a direction indicator is not in an active state, the control section enlarges a first area of an image captured by the imaging section, for example confined to the road a comparatively greater distance from the vehicle, and displays the first area on the display section. In cases in which the direction indicator is in an active state and either the vehicle is at a predetermined vehicle speed or lower or the steering angle of the vehicle is a predetermined steering angle or greater, the control section displays on the display section an area of the image captured by the imaging section that is wider than the first area and includes the first area. This enables a driver to view a wider range sideways from the vehicle and to the rear side of the vehicle when the vehicle is turning than when the vehicle is not turning, thereby enabling safer turning in which the wheels do not come off the road or ride up onto a curb.

The electronic mirror system is operated by a power supply from a vehicle battery. Were operation of the electronic mirror system to be shut down at the same time as a power unit of the vehicle is shut down, the ability to view the vehicle surroundings required when exiting the vehicle and so on would be reduced. There is thus a need to actuate the electronic mirror system for a predetermined duration after the power unit has been shut down. However, since the electronic mirror system is operated by a power supply from the vehicle battery as described above, there is a need to give consideration to a drop in the battery voltage when the electronic mirror system is operated after the power unit has been shut down. There is accordingly room for improvement of the prior art regarding this point.

SUMMARY

The present disclosure obtains a vehicle surroundings display device capable of both protecting a battery and securing the ability to view the vehicle surroundings after a power unit of the vehicle has been shut down.

A first aspect of the present disclosure is a vehicle surroundings display device including an imaging device that images a region toward a rear side of a vehicle and sideways from the vehicle; a display device that is capable of displaying an image captured by the imaging device; and a controller that controls display of the display device by selectively adopting: a normal active mode in which the imaging device and the display device are in actuated states and the display device is in an image-displaying state when a power unit of the vehicle is in an actuated state, a power-off active mode in which the imaging device and the display device are in actuated states and the display device is in an image-displaying state when the power unit of the vehicle is in a shut-down state, a standby mode in which the imaging device and the display device are in actuated states and the display device is in a non-image-displaying state when the power unit of the vehicle is in the shut-down state, or a shut-down mode in which the imaging device and the display device are in shut-down states and the display device is in a non-image-displaying state when the power unit of the vehicle is in the shut-down state, wherein, when the power unit has been shut down, the control device performs: normal shut-down processing in which transition is made to the standby mode when a first predetermined standby duration has elapsed since transitioning to the power-off active mode, and transition is made from the standby mode to the shut-down mode when a second predetermined standby duration has elapsed, or power-saving processing in which transition is made to the shut-down mode without waiting for the first predetermined standby duration or the second predetermined standby duration in cases in which a predetermined shut-down condition has been satisfied after having transitioned to the power-off active mode or to the standby mode.

According to the first aspect, the vehicle surroundings display device includes the imaging device, the display device, and the controller. The imaging device images a region toward a rear side of the vehicle and sideways from the vehicle. The display device is capable of displaying an image captured by the imaging device. The controller controls display of the display device by selectively adopting the normal active mode, the power-off active mode, the standby mode, or the shut-down mode. In the normal active mode, the imaging device and the display device are in actuated states and the display device is in the image-displaying state when a power unit of the vehicle is in the actuated state. In the power-off active mode, the imaging device and the display device are in actuated states and the display device is in the image-displaying state when the power unit is in the shut-down state. In the standby mode, the imaging device and the display device are in actuated states and the display device is in a non-image-displaying state when the power unit is in the shut-down state. In the shut-down mode, the imaging device and the display device are in shut-down states and the display device is in a non-image-displaying state when the power unit is in the shut-down state. Moreover, in the normal shut-down processing performed when the power unit has been shut down, transition is made to the standby mode when the first predetermined standby duration has elapsed since transitioning to the power-off active mode, and transition is made from the standby mode to the shut-down mode when a second predetermined standby duration has elapsed. Accordingly, in the normal shut-down processing, the display device is in the power-off active mode during the first predetermined standby duration, enabling the vehicle surroundings to be viewed using the display device that is in the image-displaying state. During the second predetermined standby duration, although the display device is in the non-image-displaying state due to being in the standby mode, since the display device is in an actuated state, the display device can be transitioned quickly to the image-displaying state. This enables a quick transition to a state enabling the vehicle surroundings to be viewed, even when in the standby mode. This enables the ability to view the vehicle surroundings to be improved for a brief period after the power unit has been shut down.

Note that in the power-saving processing performed by the controller when the power unit is shut down, after having transitioned to the power-off active mode or to the standby mode, transition is made to the shut-down mode without waiting for the above-described first predetermined standby duration or second predetermined standby duration in cases in which the predetermined shut-down condition has been satisfied. In such cases, the imaging device and the display device can adopt the shut-down state at an earlier stage, thereby enabling the amount of power consumed to be suppressed. Namely, this enables the load on the battery supplying power to the vehicle surroundings display device to be reduced.

A second aspect of the present disclosure is the vehicle surroundings display device of the first aspect, wherein the predetermined shut-down condition in the power-saving processing is a case in which a vehicle door has been locked from outside the vehicle.

According to the second aspect, the predetermined shut-down condition in the power-saving processing performed by the controller is a case in which the vehicle door has been locked from outside the vehicle. This enables the amount of power consumed to be effectively suppressed. Namely, a state in which the vehicle door has been locked from outside the vehicle generally equates to a state in which the vehicle is unoccupied, and so there is little need to view the vehicle surroundings from inside the vehicle. Namely, there is no need for the vehicle surroundings display device to be activated in a state in which the vehicle door has been locked from outside the vehicle, and so transitioning to the shut-down mode when the vehicle door has been locked from outside the vehicle, without waiting for the first predetermined standby duration or the second predetermined standby duration, enables the amount of power consumed to be effectively suppressed.

A third aspect of the present disclosure is the vehicle surroundings display device of the first aspect or the second aspect, wherein the predetermined shut-down condition in the power-saving processing is a case in which a vehicle battery voltage has dropped to a predetermined voltage or lower.

According to the third aspect, the predetermined shut-down condition in the power-saving processing performed by the controller is a case in which the vehicle battery voltage has dropped to the predetermined voltage or lower. This enables a drop in the ability of the power unit to restart to be suppressed. Namely, when there is a marked drop in the battery voltage of the vehicle, the power unit of the vehicle becomes difficult to restart. By transitioning to the shut-down mode without waiting for the first predetermined standby duration or the second predetermined standby duration when the battery voltage has dropped to the predetermined voltage or lower, further battery power consumption is suppressed. Namely, a drop in the battery voltage can be suppressed, enabling a drop in the ability of the power unit to restart to be suppressed.

A fourth aspect of the present disclosure is the vehicle surroundings display device of any one of the first aspect to the third aspect, wherein the predetermined shut-down condition in the power-saving processing is a case in which a vehicle door of the vehicle has been opened and then closed when a current location of the vehicle is a predetermined location.

According to the fourth aspect, the predetermined shut-down condition in the power-saving processing performed by the controller is a case in which a vehicle door of the vehicle has been opened and then closed when a current location of the vehicle is a predetermined location, thereby enabling the amount of power consumed to be effectively suppressed. Namely, in a state in which the vehicle door has been opened and then closed while the vehicle is in a parking lot such as a parking area, there is a high possibility that the occupant has exited the vehicle, and so there is little need to view the vehicle surroundings from inside the vehicle. Namely, in certain locations, there is no need for the vehicle surroundings display device to be activated when in a state in which the vehicle door has been opened and then closed. Thus, transitioning to the shut-down mode without waiting for the first predetermined standby duration or the second predetermined standby duration when the vehicle door of the vehicle has been opened and then closed while the current location of the vehicle is the predetermined location enables the amount of power consumed to be effectively suppressed.

A fifth aspect of the present disclosure is the vehicle surroundings display device of any one of the first aspect to the fourth aspect, wherein the predetermined shut-down condition in the power-saving processing is a case in which a vehicle door of the vehicle has been opened and then closed at a time other than when a hazard lamp of the vehicle is illuminated.

According to the fifth aspect, the predetermined shut-down condition in the power-saving processing performed by the controller is a case in which the vehicle door of the vehicle has been opened and then closed at a time other than when the hazard lamp of the vehicle is illuminated, thereby enabling the amount of power consumed to be effectively suppressed. Namely, in a state in which the vehicle door has been opened and then closed while the hazard lamp is illuminated, the occupant has often only temporarily exited the vehicle, and so there is a high possibility that the occupant will return to the vehicle relatively quickly. In contrast thereto, in a state in which the vehicle door has been opened and then closed when the hazard lamp is not illuminated, there is a high possibility that the occupant has exited the vehicle and that their duration away from the vehicle will be longer than if the hazard lamp were illuminated. Namely, in a state in which the vehicle door has been opened and then closed and the hazard lamp is not illuminated, there is little need to activate the vehicle surroundings display device. Thus, transitioning to the shut-down mode without waiting for the first predetermined standby duration or the second predetermined standby duration in a state in which the vehicle door has been opened and then closed and the hazard lamp is not illuminated enables the amount of power consumed to be effectively suppressed.

A sixth aspect of the present disclosure is the vehicle surroundings display device of any one of the first aspect to the fifth aspect, wherein the controller performs activation processing to transition to the power-off active mode or the normal active mode within a predetermined duration in cases in which a predetermined activation condition is satisfied while in the shut-down mode or in the standby mode.

According to the sixth aspect, the controller performs activation processing to transition to the power-off active mode or the normal active mode within the predetermined duration in cases in which the predetermined activation condition is satisfied while in the shut-down mode or in the standby mode. This enables the display device to adopt the image-displaying state quickly, even in cases in which the display device is in the non-image-displaying state. This enables power consumption to be suppressed by placing the display device in the non-image-displaying state, while enabling the display device to adopt the image-displaying state promptly when necessary, thereby enabling the ability to view the vehicle surroundings to be secured.

A seventh aspect of the present disclosure is the vehicle surroundings display device of the sixth aspect, wherein a first activation condition of the predetermined activation condition in the activation processing is a case in which the power unit of the vehicle has transitioned from the shut-down state to the actuated state; and the controller performs activation processing to transition from the shut-down mode or the standby mode to the normal active mode in cases in which the first activation condition has been satisfied.

According to the seventh aspect, the first activation condition of the predetermined activation conditions in the activation processing performed by the controller is a case in which the power unit of the vehicle has transitioned from the shut-down state to the actuated state. Moreover, the controller performs activation processing to transition from the shut-down mode or the standby mode to the normal active mode in cases in which the first activation condition has been satisfied, thereby enabling the display device to adopt the image-displaying state quickly in cases in which there is a high possibility that the vehicle will be driven, namely, when the power unit has been actuated. This enables the ability to view the vehicle surroundings to be secured prior to the vehicle being driven, while suppressing power consumption.

An eighth aspect of the present disclosure is the vehicle surroundings display device of the sixth aspect or the seventh aspect, wherein a second activation condition of the predetermined activation condition in the activation processing is a case in which a vehicle door of the vehicle has been opened; and the controller performs activation processing to transition from the shut-down mode or the standby mode to the power-off active mode in cases in which the second activation condition has been satisfied.

According to the eighth aspect, the second activation condition of the predetermined activation conditions in the activation processing performed by the controller is a case in which the vehicle door has been opened. Moreover, the controller performs the activation processing to transition from the shut-down mode or the standby mode to the power-off active mode in cases in which the second activation condition has been satisfied, thereby enabling the display device to adopt the image-displaying state quickly when an occupant has opened the vehicle door in order to board the vehicle. This enables the ability to view the vehicle surroundings to be secured in cases in which the vehicle has been boarded, while suppressing power consumption.

As described above, the vehicle surroundings display device according to the first aspect is capable of both protecting the battery and securing the ability to view the vehicle surroundings after the power unit of the vehicle has been shut down.

The vehicle surroundings display devices according to the second, fourth, and fifth aspects are capable of effectively protecting the battery.

The vehicle surroundings display device according to the third aspect is capable of securing the ability to restart the power unit.

The vehicle surroundings display devices according to the sixth to the eighth aspects are capable of both protecting the battery ore effectively and securing the ability to view the vehicle surroundings after the power unit of the vehicle has been shut down.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
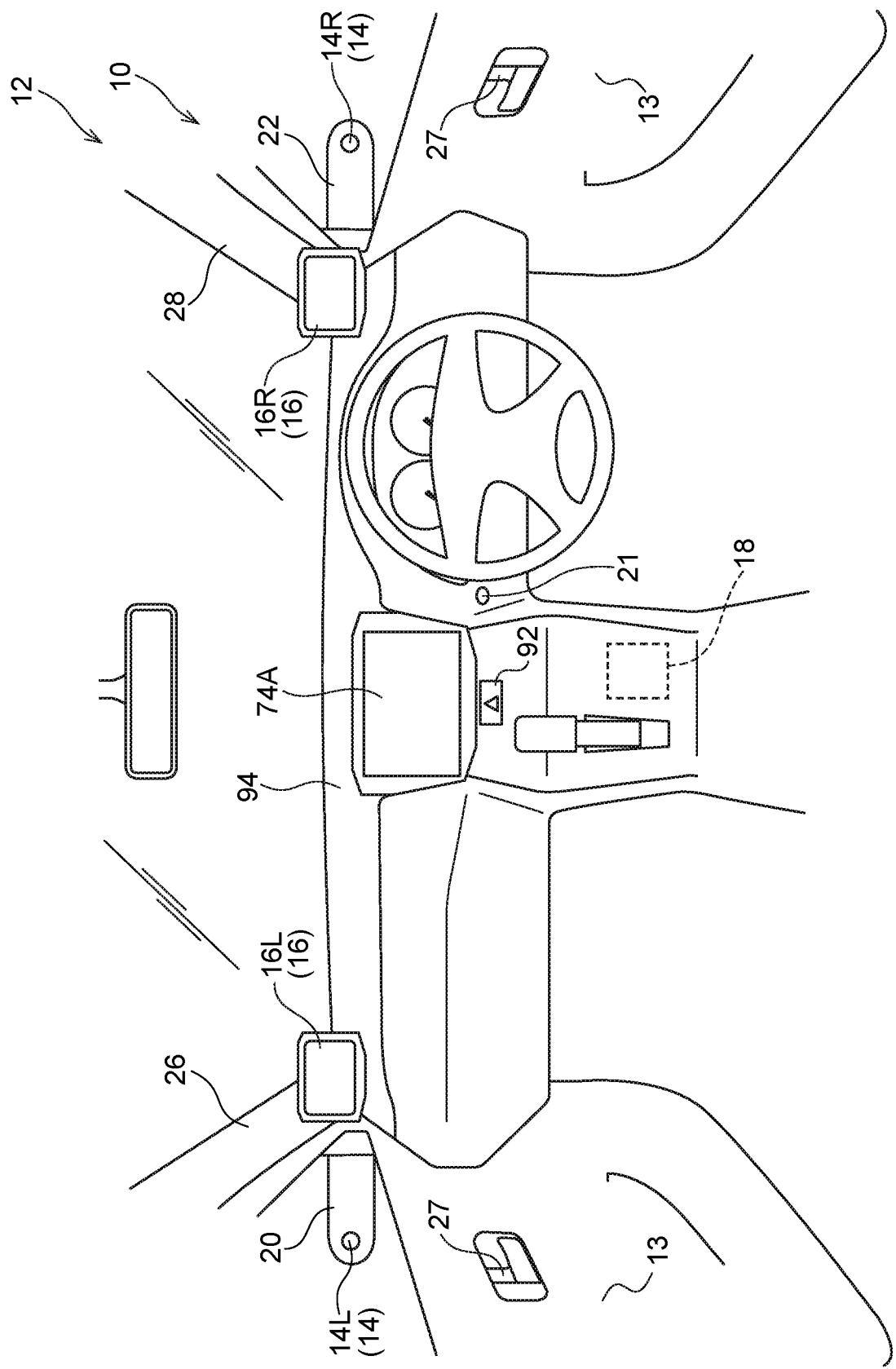
FIG. 1 is a schematic view illustrating an instrument panel of a vehicle including a vehicle surroundings display device according to a first exemplary embodiment, as viewed from a vehicle cabin inner side.

Explanation follows regarding a first exemplary embodiment of a vehicle surroundings display device according to the present disclosure, with reference to FIG. 1 to FIG. 5. Note that in each of the drawings, the same reference numerals are allocated to the same or equivalent configuration elements and parts. Moreover, proportions in the drawings may be exaggerated to aid explanation and thus may differ from the actual proportions.

Overall Configuration

As illustrated in FIG. 1, a vehicle surroundings display device 10 includes a camera unit 14 serving as an imaging device mounted to a vehicle 12, a monitor unit 16 serving as a display device, and a control device 18 serving as a controller.

A base portion of a substantially rectangular block shaped camera support body 20 with a circular arc shaped leading end portion is attached to a vehicle front side end of a vehicle vertical direction intermediate portion of a vehicle door 13 (a left front side door) of the vehicle 12, such that the leading end portion of the camera support body 20 projects toward the vehicle outer side. A rear-left facing camera 14L configuring part of the camera unit 14 is attached in the vicinity of the leading end portion of the camera support body 20. An imaging optical axis (lens) of the rear-left facing camera 14L faces toward the rear-left of the vehicle so as to image a region to the rear-left side and sideways from the left of the vehicle. The camera support body 20 is capable of swinging in the vehicle front-rear direction about an axial direction running substantially along the vehicle vertical direction. Using drive force of an actuator, not illustrated in the drawings, the camera support body 20 is capable of swinging between a stowed position where the length direction of the camera support body 20 substantially follows an outer face of the vehicle, and a deployed position from which the rear-left facing camera 14L captures images at the rear-left of the vehicle. Specific configuration and operation of the rear-left facing camera 14L will be described later.

A base portion of a camera support body 22 that has a profile with left-right symmetry to the camera support body 20 is attached to a vehicle front side end of a vehicle vertical direction intermediate portion of a vehicle door 13 (a right front side door) of the vehicle 12. A rear-right facing camera 14R configuring another part of the camera unit 14 is attached in the vicinity of a leading end portion of the camera support body 22. An imaging optical axis (lens) of the rear-right facing camera 14R faces toward the rear-right of the vehicle so as to image a region to the rear-right side and sideways from the right of the vehicle. The camera support body 22 is also capable of swinging in the vehicle front-rear direction about an axial direction running substantially along the vehicle vertical direction. Using drive force of an actuator, not illustrated in the drawings, the camera support body 22 is capable of swinging between a stowed position where the length direction of the camera support body 22 substantially follows an outer face of the vehicle, and a deployed position from which the rear-right facing camera 14R captures images at the rear-right of the vehicle. Specific configuration and operation of the rear-right facing camera 14R will be described later.

A left monitor 16L configuring part of the monitor unit 16 is provided at a vehicle cabin inner side in the vicinity of a lower end of a left front pillar garnish 26. Specific configuration and operation of the left monitor 16L will be described later.

A right monitor 16R configuring another part of the monitor unit 16 is provided at the vehicle cabin inner side in the vicinity of a lower end of a right front pillar garnish 28. Specific configuration and operation of the right monitor 16R will be described later.

Hardware Configuration

Figure 2:
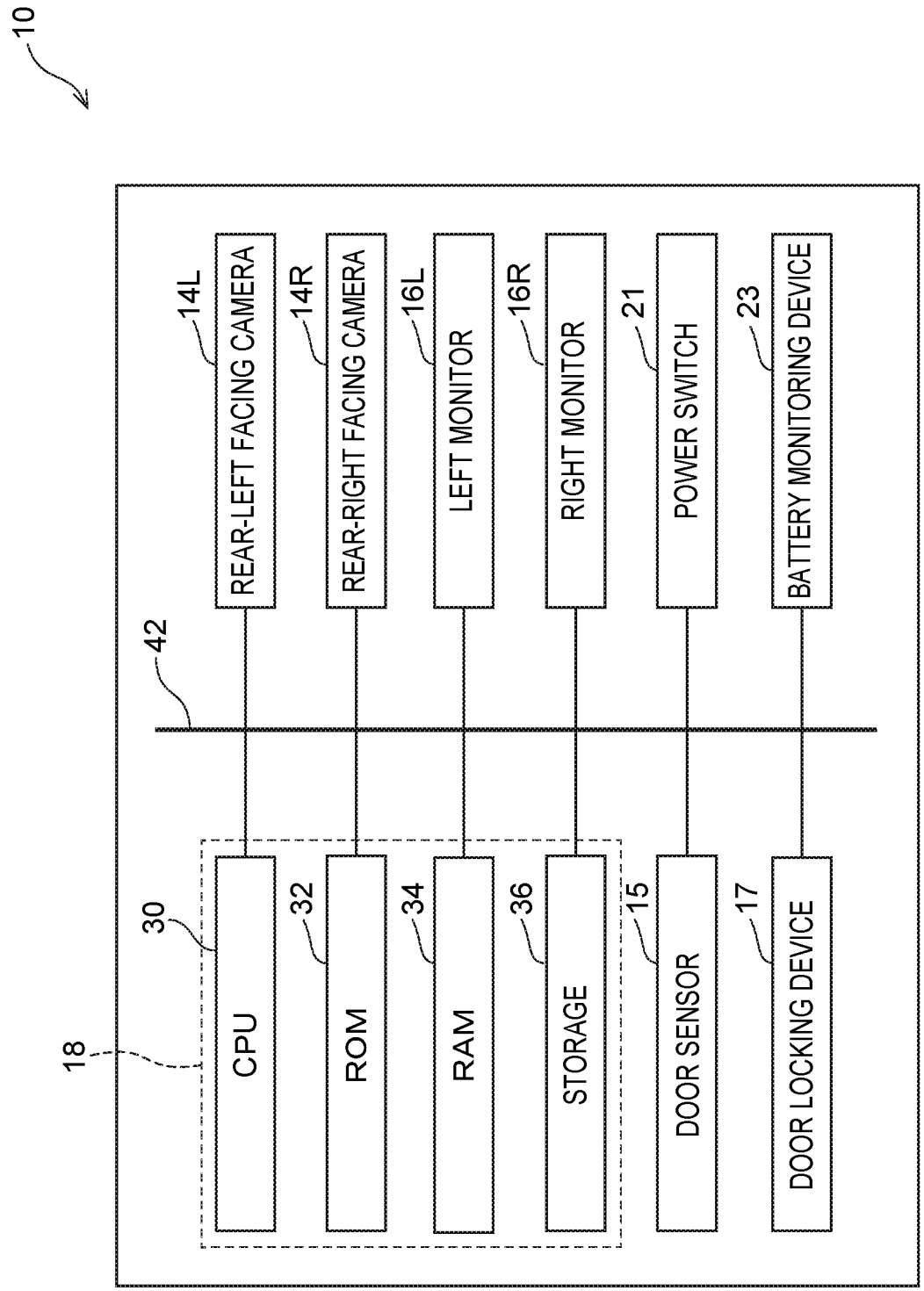
FIG. 2 is a block diagram illustrating a hardware configuration of a vehicle surroundings display device according to the first exemplary embodiment.

FIG. 2 is a block diagram illustrating a hardware configuration of the vehicle surroundings display device 10.

As illustrated in FIG. 2, the vehicle surroundings display device 10 is configured including a Central Processing Unit (CPU) 30, Read Only Memory (ROM) 32, Random Access Memory (RAM) 34, and storage 36, each provided within the control device 18, as well as the rear-left facing camera 14L, the rear-right facing camera 14R, the left monitor 16L, the right monitor 16R, a door sensor 15, a door locking device 17, a power switch 21, and a battery monitoring device 23. These configuration elements are connected so as to be capable of communicating with each other through a bus 42.

The CPU 30 is a central processing unit that executes various programs and controls various sections. Namely, the CPU 30 reads a program from the ROM 32 or the storage 36, and executes the program using the RAM 34 as a workspace. The CPU 30 controls the various configuration elements and performs various computation processing according to the programs stored in the ROM 32 or the storage 36. In the present exemplary embodiment, a display control program to control actuation and shut-down of the camera unit 14 and the monitor unit 16, and to perform image processing on an image to be displayed on the monitor unit 16, is held in the ROM 32 or the storage 36.

The ROM 32 holds various programs and various data. The RAM 34 serves as a workspace in which programs or data are temporarily stored. The storage 36 is configured by a Hard Disk Drive (HDD) or a Solid State Drive (SSD), and holds various programs and various data, including an operating system.

As an example, the rear-left facing camera 14L is not provided with a mechanism to adjust the orientation of the imaging optical axis, and has a lens with a fixed focal point and a relatively wide view angle. Thus, in a state in which the camera support body 20 is positioned at the deployed position, the rear-left facing camera 14L images in a fixed imaging range with a relatively wide view angle to the rear-left side of the vehicle.

Similarly to the rear-left facing camera 14L, as an example, the rear-right facing camera 14R is not provided with a mechanism to adjust the orientation of the imaging optical axis, and has a lens with a fixed focal point and a relatively wide view angle. Thus, in a state in which the camera support body 22 is positioned at the deployed position, the rear-right facing camera 14R images in a fixed imaging range with a relatively wide view angle to the rear-right side of the vehicle.

The left monitor 16L is a monitor for displaying images corresponding to the rear-left captured by the rear-left facing camera 14L, and is as an example configured by a liquid crystal display. Namely, the left monitor 16L functions as a substitute for a left outside mirror, and enables an occupant to check the situation in a restricted view region at the rear-left side of the vehicle by viewing an image displayed on the left monitor 16L.

The right monitor 16R is a monitor for displaying images corresponding to the rear-right captured by the rear-right facing camera 14R, and is as an example configured by a liquid crystal display. Namely, the right monitor 16R functions as a substitute for a right outside mirror, and enables the occupant to check the situation in a restricted view region at the rear-right side of the vehicle by viewing an image displayed on the right monitor 16R. Note that the left monitor 16L and the right monitor 16R have the same screen size as each other.

The door sensor 15 is a sensor that detects an open or closed state of a corresponding vehicle door 13 of the vehicle 12. For example, a magnetic sensor such as a Hall sensors or an MR sensor that detects an electromagnetic field of a non-illustrated sensor magnet provided to a side of the vehicle door 13 may be employed as the door sensor 15.

The door locking device 17 is a device that locks and unlocks the vehicle doors 13. Locking and unlocking of the vehicle doors 13 may be performed by operating a lock knob 27 (see FIG. 1) provided at the vehicle interior, or operating a non-illustrated key cylinder provided at the vehicle exterior. Note that the door locking device 17 includes a communication unit and an actuator connected to the communication unit, neither of which are illustrated in the drawings. Locking and unlocking of doors may therefore be performed by operating a non-illustrated remote key outside the vehicle, without operating the key cylinder from outside the vehicle.

The power switch 21 (again, see FIG. 1) is a switch that actuates and shuts down a non-illustrated power unit of the vehicle 12. As an example, the power unit of the vehicle 12 of the present exemplary embodiment is a hybrid system configured by a motor and an internal combustion engine, and the hybrid system can be actuated and shut down using the power switch 21. Specifically, the power unit is in an actuated state when the power switch 21 is ON, and the power unit is in a shut-down state when the power switch 21 is OFF.

The battery monitoring device 23 is a device that monitors the voltage and so on of a non-illustrated auxiliary battery, serving as a battery of the vehicle 12. The vehicle surroundings display device 10 with the above configuration is activated by power supplied from the auxiliary battery.

Functional Configuration

In order to execute the display control program, the vehicle surroundings display device 10 implements various functions using the above-described hardware resources. Explanation follows regarding the functional configuration implemented by the vehicle surroundings display device 10.

Figure 3:
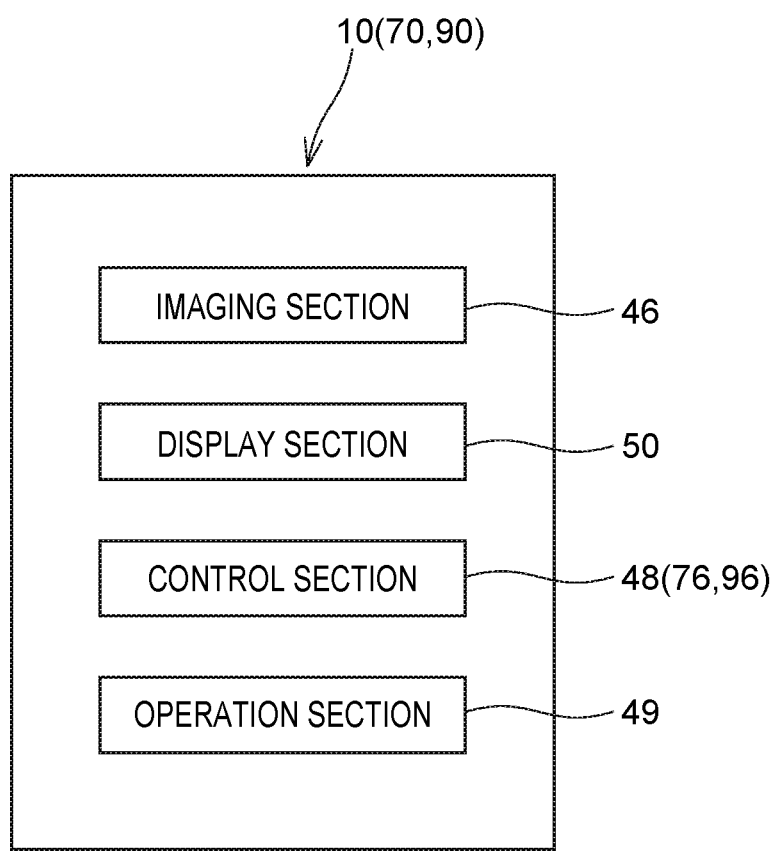
FIG. 3 is a block diagram illustrating an example of a functional configuration of a vehicle surroundings display device according to the first exemplary embodiment.

FIG. 3 is a block diagram illustrating an example of functional configuration of the vehicle surroundings display device 10.

As illustrated in FIG. 3, functional configuration of the vehicle surroundings display device 10 includes an imaging section 46 serving as an imaging device, a display section 50 serving as a display device, a control section 48 serving as a controller, and an operation section 49. Each functional configuration is implemented by the CPU 30 of the control device 18 reading and executing the display control program stored in the ROM 32 or the storage 36 (see FIG. 2).

The imaging section 46 captures video images of regions to the rear side of the vehicle and sideways from the vehicle using the camera unit 14. The camera unit 14 is configured by the rear-left facing camera 14L and the rear-right facing camera 14R, and so a region to the rear side of the vehicle and sideways from the vehicle is captured on both the left and right sides of the vehicle 12. Note that the regions sideways from the vehicle captured by the rear-left facing camera 14L and the rear-right facing camera 14R are ranges extending from the positions where the rear-left facing camera 14L and the rear-right facing camera 14R are provided to the vehicle 12 toward the rear side of the vehicle and the vehicle width direction outer sides.

The control section 48 performs image processing on the images captured by the imaging section 46, and the display section 50 displays these processed images on the left monitor 16L and the right monitor 16R (see FIG. 1).

The control section 48 receives images captured by the imaging section 46, and outputs the received images to the display section 50. Namely, an image captured by the rear-left facing camera 14L is output to the left monitor 16L configuring part of the display section 50. Similarly, an image captured by the rear-right facing camera 14R is output to the right monitor 16R configuring another part of the display section 50.

The control section 48 receives activation statuses of the power switch 21 and the door locking device 17, and voltage information regarding the auxiliary battery from the battery monitoring device 23, and selects activation states for the imaging section 46 and the display section 50 according to plural modes, described later, based on the activation statuses and the voltage information.

The operation section 49 operates the imaging section 46 and the display section 50 according to the activation states selected by the control section 48.

Processing Flow

Figure 5:
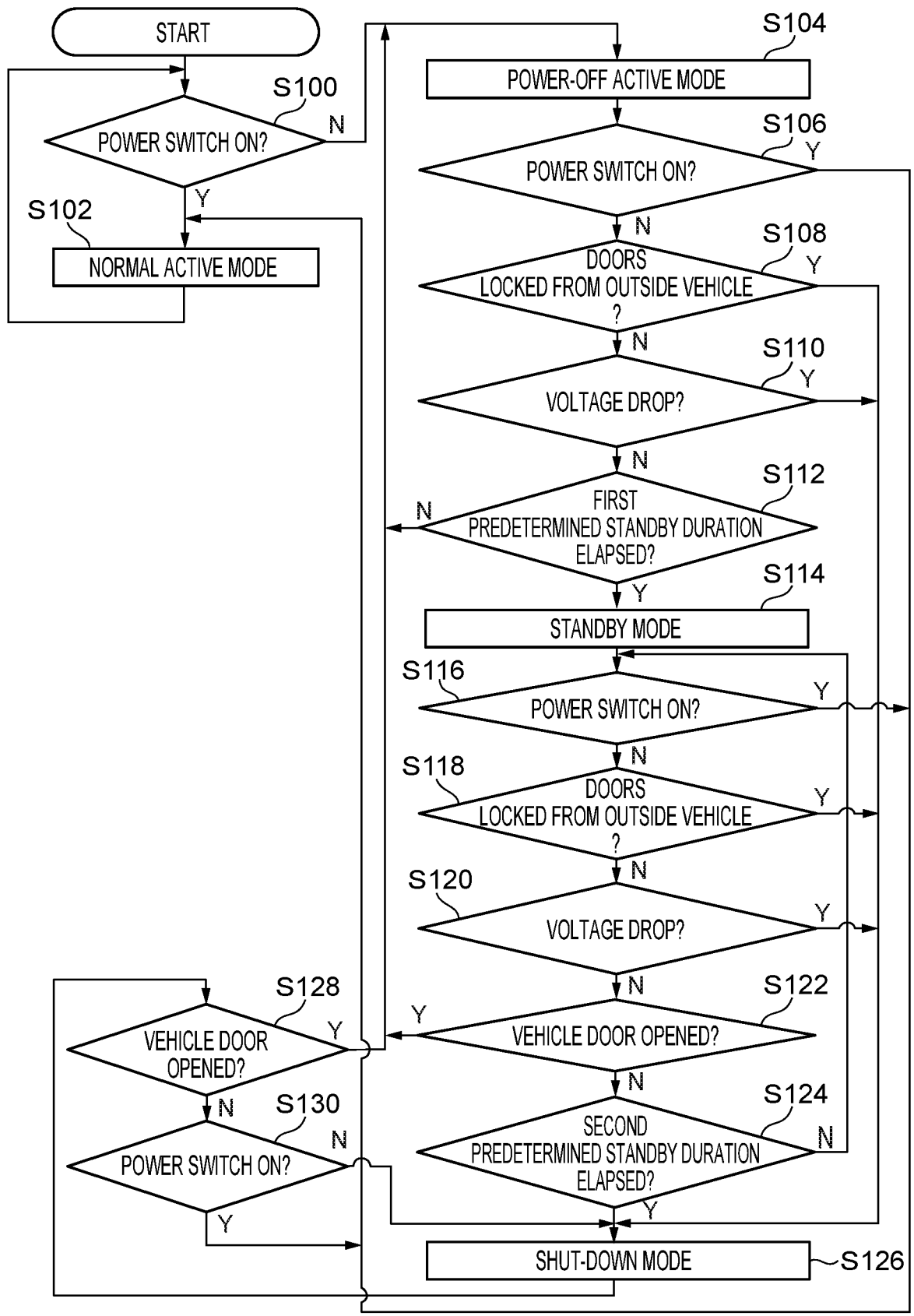
FIG. 5 is a flow chart illustrating a flow of operation of a vehicle surroundings display device according to the first exemplary embodiment.

Explanation follows regarding operation of the vehicle surroundings display device 10. FIG. 5 is a flowchart illustrating a flow of operation by the vehicle surroundings display device 10. The CPU 30 reads the display control program from the ROM 32 or the storage 36 and expands the program in the RAM 34 to execute the program in order to perform image display.

The CPU 30 determines whether or not the power switch 21 is ON (step S100). In cases in which the power switch 21 is ON (step S100: YES), the CPU 30 operates the imaging section 46 and the display section 50 according to a normal active mode (step S102), and then repeats the processing from step S100. When in the normal active mode, the imaging section 46 and the display section 50 are in actuated states and the display section 50 is in an image-displaying state, while the power unit is in the actuated state. Namely, in the normal active mode, an occupant is able to view the vehicle surroundings on the displays of the display section 50. The vehicle surroundings display device 10 is activated by power from the auxiliary battery, which is being charged by the power unit that is actuated at this time.

In cases in which the power switch 21 is OFF (step S100: NO), the CPU 30 operates the imaging section 46 and the display section 50 according to a power-off active mode (step S104). When in the power-off active mode, the imaging section 46 and the display section 50 are in actuated states and the display section 50 is in an image-displaying state, while the power unit is in the shut-down state. Namely, an occupant is able to view the vehicle surroundings on the displays of the display section 50. The vehicle surroundings display device 10 is activated by power from the auxiliary battery, which is no longer being charged by the power unit at this time.

The CPU 30 determines whether or not the power switch 21 has been switched ON (step S106). In cases in which the power switch 21 has been switched ON (step S106: YES), the CPU 30 operates the imaging section 46 and the display section 50 according to the normal active mode (step S102), and the processing from step S100 is then repeated. In cases in which the power switch 21 has not been switched ON (step S106: NO), the CPU 30 determines whether or not the doors have been locked from outside the vehicle (step S108). In cases in which the doors have been locked from outside the vehicle (step S108: YES), the CPU 30 operates the imaging section 46 and the display section 50 according to an shut-down mode (step S126). In the shut-down mode, the imaging section 46 and the display section 50 are in shut-down states and the display section 50 is in a non-image-displaying state, while the power unit is in the shut-down state. Namely, in the shut-down mode, consumption of auxiliary battery power by the vehicle surroundings display device 10 can be suppressed.

In cases in which the doors have not been locked from outside the vehicle (step S108: NO), the CPU 30 determines whether or not the auxiliary battery voltage has dropped to a predetermined voltage or lower (step S110). As an example, this predetermined voltage is a lower limit voltage at which the power unit is still able to transition back from the shut-down state to the actuated state, and is set at 9.6V in the present exemplary embodiment. Note that when determining the auxiliary battery voltage, as an example, the voltage is determined to have dropped in cases in which a state in which the voltage has dropped below the predetermined voltage has continued for a predetermined duration, such that a temporary drop in voltage is not interpreted as a drop in voltage corresponding to this determination. In cases in which the auxiliary battery voltage has dropped (step S110: YES), the CPU 30 operates the imaging section 46 and the display section 50 according to the shut-down mode (step S126). In cases in which the voltage of the auxiliary battery has not dropped (step S110: NO), the CPU 30 determines whether or not a first predetermined standby duration has elapsed (step S112). As an example, the first predetermined standby duration is set to 120 seconds or longer after switching OFF the power switch 21, and is set to 130 seconds in the present exemplary embodiment.

Figure 4:
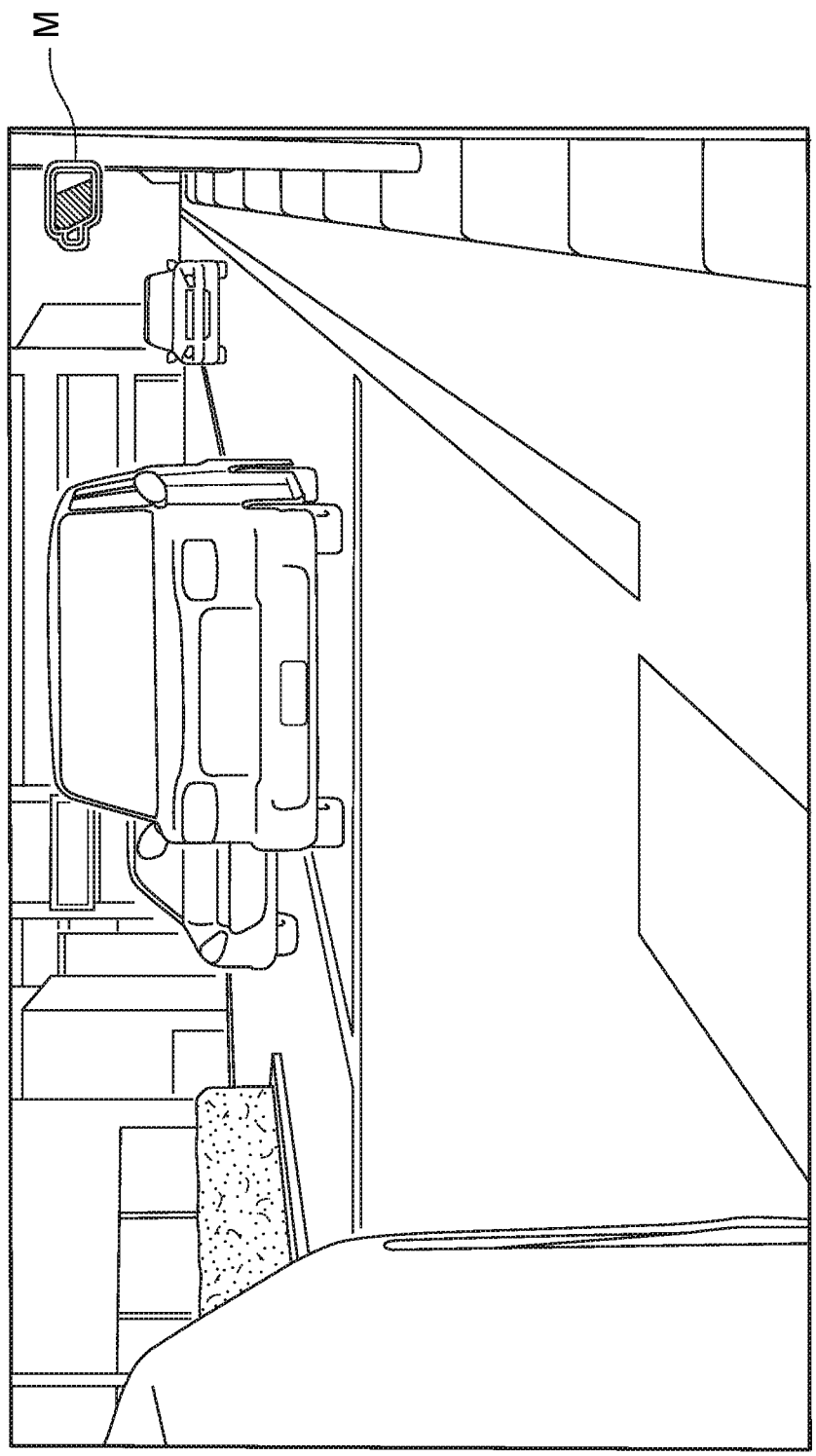
FIG. 4 is a schematic view illustrating an example of a display image displayed on a display section of a vehicle surroundings display device according to the first exemplary embodiment.

In cases in which the first predetermined standby duration has not elapsed (step S112: NO), the CPU 30 repeats the processing from step S104. In cases in which the first predetermined standby duration has elapsed (step S112: YES), the CPU 30 operates the imaging section 46 and the display section 50 according to a standby mode (step S114). When in the standby mode, the imaging section 46 and the display section 50 are in actuated states and the display section 50 is in a non-image-displaying state, while the power unit is in the shut-down state. When in the non-image-displaying state, the display section 50 that is in the standby mode displays an image captured by the imaging section 46 on a non-illustrated liquid crystal display whose power source is on, and a backlight of the liquid crystal display is in a non-illuminated state. Namely, in the standby mode, the occupant is unable to see the display on the display section 50, and so is unable to view the vehicle surroundings using the display section 50. Moreover, since the backlight of the display section 50 is not illuminated, the amount of power consumed can be suppressed in comparison to the power-off active mode. However, illuminating the backlight of the display section 50 while in the standby mode enables the image on the liquid crystal display of the display section 50 to adopt a state that can be seen by an occupant (the image-displaying state), thereby enabling a faster transition to the image-displaying state than when transitioning from the shut-down mode. Note that when transitioning from step S112 to step S114, as illustrated in FIG. 4 as an example, the display section 50 adopts the non-image-displaying state after a notification symbol M displayed on the display section 50 has been flashing for a predetermined duration in order to notify the occupant that image display will end imminently.

The CPU 30 determines whether or not the power switch 21 has been switched ON as a first activation condition (step S116). In cases in which the power switch 21 has been switched ON (step S116: YES), namely, in cases in which the first activation condition has been satisfied, the CPU 30 operates the imaging section 46 and the display section 50 according to the normal active mode (step S102), and then repeats the processing from step S100. In cases in which the power switch 21 has not been switched on (step S116: NO), the CPU 30 determines whether or not the doors have been locked from outside the vehicle (step S118). In cases in which the doors have been locked from outside the vehicle (step S118: YES), the CPU 30 operates the imaging section 46 and the display section 50 according to the shut-down mode (step S126).

In cases in which the doors have not been locked from outside the vehicle (step S118: NO), the CPU 30 determines whether or not the auxiliary battery voltage has dropped to the predetermined voltage or lower (step S120). In cases in which the auxiliary battery voltage has dropped to the predetermined voltage or lower (step S120: YES), the CPU 30 operates the imaging section 46 and the display section 50 according to the shut-down mode (step S126). In cases in which the auxiliary battery voltage has not dropped to the predetermined voltage or lower (step S120: NO), the CPU 30 determines whether or not one of the vehicle doors 13 has been opened as a second activation condition (step S122). In cases in which the vehicle door 13 has been opened (step S122: YES), the CPU 30 determines that "an occupant is attempting to board or exit the vehicle", and repeats the processing from step S104 so as to enable the surroundings of the vehicle 12 to be viewed. In cases in which the vehicle door 13 has not been opened (step S122: NO), the CPU 30 determines whether or not a second predetermined standby duration has elapsed (step S124). As an example, the second predetermined standby duration is set to 420 seconds or longer from when another mode transitioned to the standby mode and the display section 50 adopted the non-image-displaying state, and is set to 420 seconds in the present exemplary embodiment.

In cases in which the second predetermined standby duration has not elapsed (step S124: NO), the CPU 30 repeats the processing from step S116. In cases in which the second predetermined standby duration has elapsed (step S124: YES), the CPU 30 operates the imaging section 46 and the display section 50 according to the shut-down mode (step S126).

The CPU 30 determines whether or not the vehicle door 13 has been opened (step S128). In cases in which the vehicle door 13 has been opened (step S128: YES), the CPU 30 repeats the processing from step S104. In cases in which the vehicle door 13 has not been opened (step S128: NO), the CPU 30 determines whether or not the power switch 21 has been switched ON (step S130). In cases in which the power switch 21 has been switched ON (step S130: YES), the CPU 30 operates the imaging section 46 and the display section 50 according to the normal active mode (step S102), and then repeats the processing from step S100. In cases in which the power switch 21 has not been switched ON (step S130: NO), the CPU 30 repeats the processing from step S126.

To explain the above processing in other words, when the power switch 21 has been switched OFF, the control section 48 transitions to the shut-down mode via two processing flows, these being normal shut-down processing and power-saving processing. Namely, the normal shut-down processing refers to processing in which transition is made to the standby mode when the first predetermined standby duration has elapsed since transitioning to the power-off active mode, and transition is made from the standby mode to the shut-down mode when the second predetermined standby duration has elapsed. In the normal shut-down processing, the vehicle surroundings display device 10 is in the power-off active mode during the first predetermined standby duration, thereby enabling the vehicle surroundings to be viewed on the display section that is in the image-displaying state. The vehicle surroundings display device 10 is then in the standby mode during the second predetermined standby duration, thereby enabling a quick transition to the image-displaying state if the power switch 21 is switched ON, this being the first activation condition, or in cases in which the vehicle door 13 has been opened, this being the second activation condition.

The power-saving processing refers to processing in which transition is made to the shut-down mode without waiting for the first predetermined standby duration or the second predetermined standby duration in cases in which the vehicle door 13 has been locked from outside the vehicle after the transition to the power-off active mode or the standby mode, or in cases in which the auxiliary battery voltage has dropped to the predetermined voltage or lower. In the power-saving processing, when the vehicle surroundings display device 10 is in the power-off active mode or in the standby mode, during which the auxiliary battery is not being charged due to the power unit being in the shut-down state, the vehicle surroundings display device 10 is placed in the shut-down mode in cases in which the vehicle cabin has been deemed to be unoccupied, and in cases in which there is a high possibility of the power unit being unable to restart. This enables further power consumption by the auxiliary battery to be suppressed.

Operation of First Exemplary Embodiment

Explanation follows regarding operation of the first exemplary embodiment.

As illustrated in FIG. 3, in the present exemplary embodiment, the vehicle surroundings display device 10 includes the imaging section 46, the display section 50, and the control section 48. The imaging section 46 images regions to the rear side of the vehicle and sideways from the vehicle. The display section 50 is capable of displaying images captured by the imaging section 46. The control section 48 controls display by the display section 50 selectively, using the normal active mode, the power-off active mode, the standby mode, or the shut-down mode. In the normal active mode, the imaging section 46 and the display section 50 are in actuated states and the display section 50 is in the image-displaying state, while the power unit of the vehicle 12 is in the actuated state. In the power-off active mode, the imaging section 46 and the display section 50 are in actuated states and the display section 50 is in the image-displaying state, while the power unit is in the shut-down state. In the standby mode, the imaging section 46 and the display section 50 are in actuated states and the display section 50 is in the non-image-displaying state, while the power unit is in the shut-down state. In the shut-down mode, the imaging section 46 and the display section 50 are in shut-down states and the display section 50 is in the non-image-displaying state, while the power unit is in the shut-down state. During normal shut-down processing, performed after the power unit has been shut down, transition is made to the standby mode when the first predetermined standby duration has elapsed since the transition to the power-off active mode, and transition is made from the standby mode to the shut-down mode when the second predetermined standby duration has elapsed. Thus, during the normal shut-down processing, the power-off active mode is in place during the first predetermined standby duration, thereby enabling the vehicle surroundings to be viewed on the display device that is in the image-displaying state. The standby mode is in place during the second predetermined standby duration, such that although the display section 50 is in the non-image-displaying state, the display section 50 is in the actuated state, and is thus capable of transitioning to the image-displaying state quickly. This enables a quick transition to a state enabling the vehicle surroundings to be viewed, even when in the standby mode. This enables the ability to view the vehicle surroundings to be improved for a brief period after the power unit has been shut down.

Note that in the power-saving processing performed by the control section 48 while the power unit is shut down, after having transitioned to the power-off active mode or to the standby mode, transition is made to the shut-down mode without waiting for the above-described first predetermined standby duration or second predetermined standby duration in cases in which a predetermined shut-down condition has been satisfied. In such cases, the imaging section 46 and the display section 50 can adopt the shut-down state at an earlier stage, thereby enabling the amount of power consumed to be suppressed. Namely, this enables the load on the battery supplying power to the vehicle surroundings display device 10 to be reduced. This enables both the battery to be protected and the ability to view the vehicle surroundings to be secured after the power unit of the vehicle has been shut down.

One predetermined shut-down condition in the power-saving processing performed by the control section 48 is a case in which the vehicle door 13 has been locked from outside the vehicle. This enables the amount of power consumed to be effectively suppressed. Namely, a state in which the vehicle door 13 has been locked from outside the vehicle generally equates to a state in which the vehicle 12 is unoccupied, and so there is little need to view the vehicle surroundings from inside the vehicle. Namely, there is no need for the vehicle surroundings display device 10 to be activated in a state in which the vehicle door 13 has been locked from outside the vehicle, and so transitioning to the shut-down mode when the vehicle door 13 has been locked from outside the vehicle, without waiting for the first predetermined standby duration or the second predetermined standby duration, enables the amount of power consumed to be effectively suppressed. This enables the auxiliary battery to be effectively protected.

Another predetermined shut-down conditions in the power-saving processing performed by the control section 48 is a case in which the vehicle battery voltage has dropped to the predetermined voltage or lower. This enables a drop in the ability of the power unit to restart to be suppressed. Namely, when there is a marked drop in the battery voltage of the vehicle 12, the power unit of the vehicle 12 becomes difficult to restart. By transitioning to the shut-down mode without waiting for the first predetermined standby duration or the second predetermined standby duration when the battery voltage has dropped to the predetermined voltage or lower, further battery power consumption is suppressed. Namely, a drop in the battery voltage can be suppressed, enabling a drop in the ability of the power unit to restart to be suppressed. This enables the ability to restart the power unit to be secured.

Furthermore, the control section 48 performs activation processing to transition to the power-off active mode or the normal active mode within a predetermined duration when a predetermined activation condition is satisfied when in the shut-down mode or the standby mode. This enables the display section 50 to adopt the image-displaying state quickly, even in cases in which the display section 50 is in the non-image-displaying state. This enables power consumption to be suppressed by placing the display section 50 in the non-image-displaying state, while enabling the display section 50 to adopt the image-displaying state promptly when necessary, thereby enabling the ability to view the vehicle surroundings to be secured.

Moreover, the first activation condition of the predetermined activation conditions in the activation processing performed by the control section 48 is a case in which the power unit of the vehicle 12 has transitioned from the shut-down state to the actuated state. In cases in which the first activation condition has been satisfied, the control section 48 performs activation processing to transition from the shut-down mode or the standby mode to the normal active mode, thereby enabling the display section 50 to adopt the image-displaying state quickly in cases in which there is a high possibility that the vehicle 12 will be driven, namely, when the power unit has been actuated. This enables the ability to view the vehicle surroundings to be secured prior to the vehicle 12 being driven, while suppressing power consumption.

Furthermore, the second activation condition of the predetermined activation conditions in the activation processing performed by the control section 48 is a case in which the vehicle door 13 has been opened. In cases in which the second activation condition has been satisfied, the control section 48 performs activation processing to transition from the shut-down mode or the standby mode to the power-off active mode, thereby enabling the display section 50 to adopt the image-displaying state quickly when an occupant has opened the vehicle door 13 in order to board the vehicle 12. This enables the ability to view the vehicle surroundings to be secured in cases in which the vehicle 12 has been boarded, while suppressing power consumption. This enables both the battery to be protected more effectively and the ability to view the vehicle surroundings to be secured after the power unit of the vehicle has been shut down.

Second Exemplary Embodiment

Figure 6:
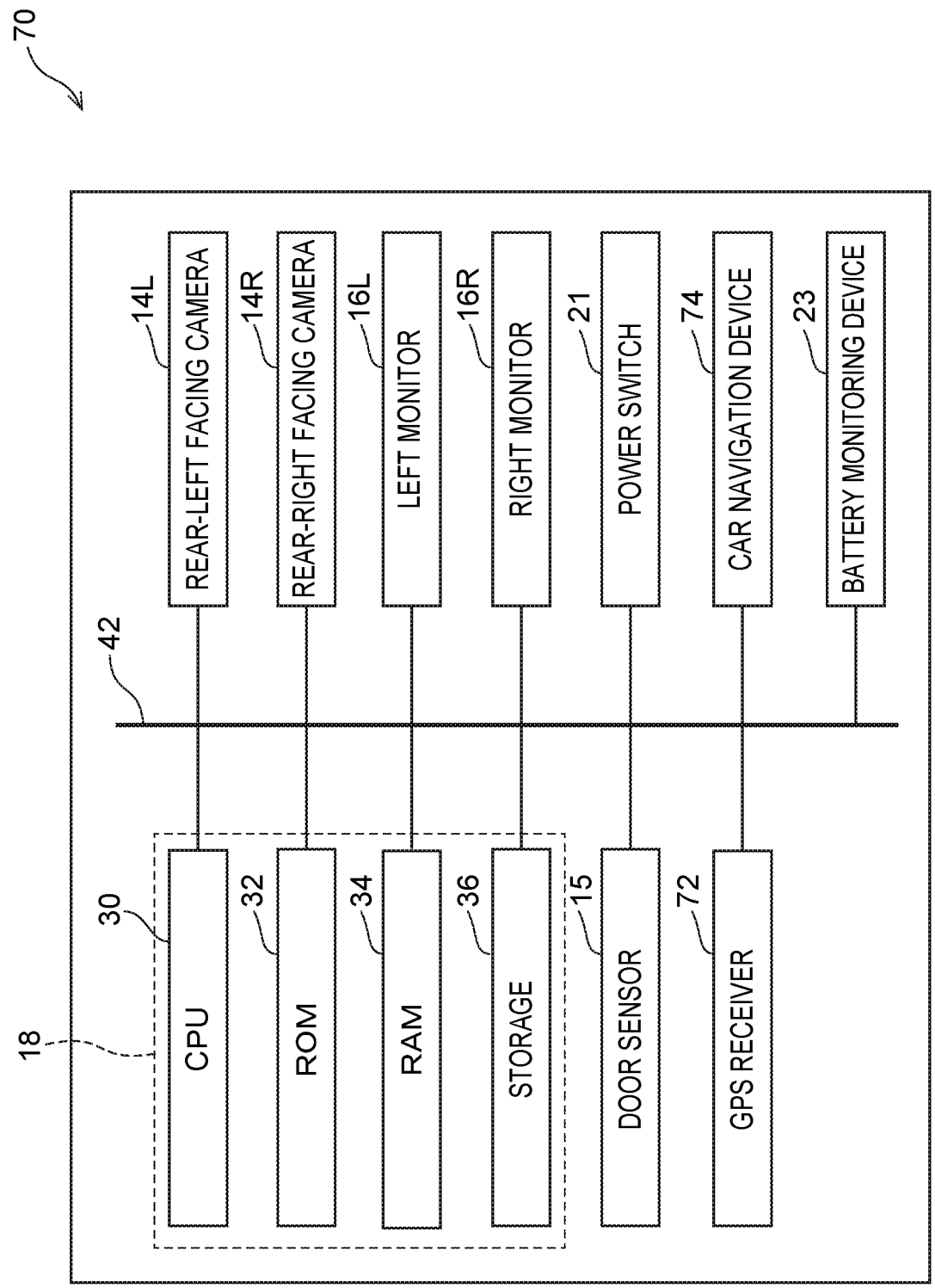
FIG. 6 is a block diagram illustrating a hardware configuration of a vehicle surroundings display device according to a second exemplary embodiment.
Figure 7:
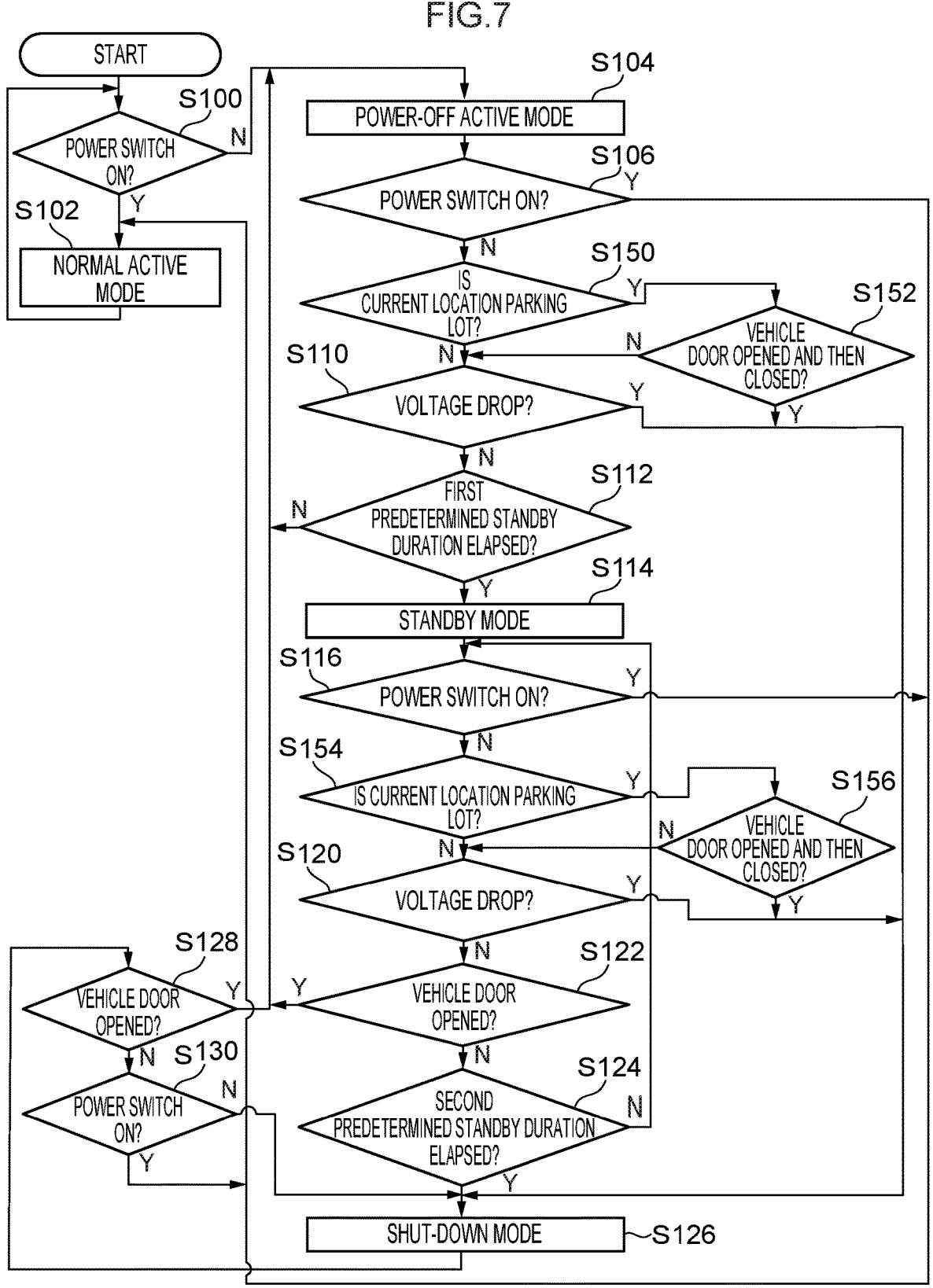
FIG. 7 is a flowchart illustrating a flow of operation of a vehicle surroundings display device according to the second exemplary embodiment.

Explanation follows regarding a vehicle surroundings display device according to a second exemplary embodiment of the present disclosure, with reference to FIG. 6 and FIG. 7. Note that configuration portions that are the same as those in the first exemplary embodiment described above are appended with the same reference numerals, and explanation thereof is omitted.

A vehicle surroundings display device 70 according to the second exemplary embodiment has the same basic configuration as that of the first exemplary embodiment, and is provided with a feature of transitioning between modes according to the current location of the vehicle 12 and opening and closing of the vehicle door 13.

Hardware Configuration

As illustrated in FIG. 6, the vehicle surroundings display device 70 is configured including the CPU 30, the ROM 32, the RAM 34, the storage 36, the rear-left facing camera 14L, the rear-right facing camera 14R, the left monitor 16L, the right monitor 16R, the door sensor 15, the power switch 21, the battery monitoring device 23, a GPS receiver 72, and a car navigation device 74. These configuration elements are connected so as to be capable of communicating with each other through the bus 42.

The GPS receiver 72 receives signals from plural satellites and uses a GPS method to identify the current position of the vehicle 12 from the different arrival times of the signals.

The car navigation device 74 compares the current position of the vehicle 12 acquired through the GPS receiver 72 against map information stored in a storage medium such as a DVD or hard disk to precisely detect the current position of the vehicle 12 on the map, and displays the current position of the vehicle 12 on a map displayed on a display device 74A (see FIG. 1). The car navigation device 74 also includes functions such as a function of acquiring information regarding the vicinity of the current position of the vehicle 12 (such as information regarding various facilities) from the storage medium and displaying this information on the display device 74A, and a function of providing route guidance to a preset destination, according to instruction by an occupant.

Functional Configuration

As illustrated in FIG. 3, functional configuration of the vehicle surroundings display device 70 includes the imaging section 46, the display section 50, a control section 76 serving as a controller, and the operation section 49. The various functional configuration is implemented by the CPU 30 of the control device 18 reading and executing a display control program stored in the ROM 32 or the storage 36 (see FIG. 6).

The control section 76 receives images captured by the imaging section 46, and outputs the received images to the display section 50. Namely, an image captured by the rear-left facing camera 14L is output to the left monitor 16L configuring part of the display section 50. Similarly, an image captured by the rear-right facing camera 14R is output to the right monitor 16R configuring another part of the display section 50.

The control section 76 receives an activation status of the power switch 21, voltage information regarding the auxiliary battery from the battery monitoring device 23, and current location information of the vehicle 12 from the car navigation device 74, and selects activation states for the imaging section 46 and the display section 50 according to plural modes, based on the activation status, the voltage information, and the current location information.

The operation section 49 operates the imaging section 46 and the display section 50 according to the activation states selected by the control section 76.

Processing Flow

Explanation follows regarding operation of the vehicle surroundings display device 70. FIG. 7 is a flowchart illustrating a flow of operation by the vehicle surroundings display device 70. The CPU 30 reads the display control program from the ROM 32 or the storage 36 and expands and executes the program in the RAM 34 to display images. Note that similar processing to that in the first exemplary embodiment is allocated the same reference numerals and explanation thereof is omitted.

In cases in which the power switch 21 has not been switched ON at step S106 (step S106: NO), the CPU 30 determines whether or not the current location of the vehicle 12 is a predetermined location (step S150). The predetermined location refers to a space where parking is possible, such as parking lot of a convenience store or a parking area (hereafter simply referred to as "parking lot"). Note that although the predetermined location is a parking lot in the present exemplary embodiment, there is no limitation thereto, and another location such as a pre-registered residence may be set as the predetermined location.

In cases in which the vehicle 12 is in a parking lot (step S150: YES), the CPU 30 determines whether or not the vehicle door 13 is in a state of having been opened and then closed (step S152). In cases in which the vehicle door 13 is in a state of having been opened and then closed (step S152: YES), the CPU 30 determines that "there is a high possibility of the occupant having exited the vehicle", and operates the imaging section 46 and the display section 50 according to the shut-down mode (step S126). In cases in which the vehicle door 13 is not in a state of having been opened and then closed (step S152: NO), the CPU 30 determines that "the occupant has not exited the vehicle", and determines whether or not the auxiliary battery voltage has dropped to a predetermined voltage or lower (step S110). In cases in which the vehicle 12 is not in a parking lot (step S150: NO) at step S150, the CPU 30 determines whether or not the auxiliary battery voltage has dropped to the predetermined voltage or lower (step S110).

In cases in which the power switch 21 has not been switched on at step S116 (step S116: NO), the CPU 30 determines whether or not the current location of the vehicle 12 is a parking lot (step S154). In cases in which the vehicle 12 is in a parking lot (step S154: YES), the CPU 30 determines whether or not the vehicle door 13 is in a state of having been opened and then closed (step S156). In cases in which the vehicle door 13 is in a state of having been opened and then closed (step S156: YES), the CPU 30 determines that "there is a high possibility of the occupant having exited the vehicle", and operates the imaging section 46 and the display section 50 according to the shut-down mode (step S126). In cases in which the vehicle door 13 is not in a state of having been opened and then closed (step S156: NO), the CPU 30 determines that "the occupant has not exited the vehicle", and determines whether or not the auxiliary battery voltage has dropped to a predetermined voltage or lower (step S120). In cases in which the vehicle 12 is not in a parking lot at step S154 (step S154: NO), the CPU 30 determines whether or not the auxiliary battery voltage has dropped to the predetermined voltage or lower (step S120). Namely, shut-down conditions in the power-saving processing by the control section 76 include a drop in the battery voltage, and "cases in which the vehicle 12 is in a parking lot and the vehicle door 13 has been opened and then closed".

Operation and Advantageous Effects of Second Exemplary Embodiment

Explanation follows regarding operation and advantageous effects of the second exemplary embodiment.

With the exception of the fact that transitioning between modes is performed according to the current location of the vehicle 12 and opening and closing of the vehicle door 13, the above configuration is configured similarly to the vehicle surroundings display device 10 of the first exemplary embodiment, so obtains similar advantageous effects to the first exemplary embodiment. The predetermined shut-down condition in the power-saving processing performed by the control section 76 is a case in which the current location of the vehicle 12 is the predetermined location and the vehicle door 13 of the vehicle 12 has been opened and then closed, thereby enabling the amount of power consumed to be effectively suppressed. Namely, in a state in which the vehicle door 13 has been opened and then closed while the vehicle 12 is in a parking lot such as a parking area, there is a high possibility that the occupant has exited the vehicle, and so there is little need to view the vehicle surroundings from inside the vehicle. Namely, in certain locations, there is no need for the vehicle surroundings display device 70 to be activated when in a state in which the vehicle door 13 has been opened and then closed. Thus, transitioning to the shut-down mode without waiting for the first predetermined standby duration or the second predetermined standby duration when the vehicle door 13 of the vehicle 12 has been opened and then closed while the current location of the vehicle 12 is the predetermined location enables the amount of power consumed to be effectively suppressed. This enables both the battery to be protected and the ability to view the vehicle surroundings to be secured after the power unit of the vehicle 12 has been shut down.

Third Exemplary Embodiment

Figure 8:
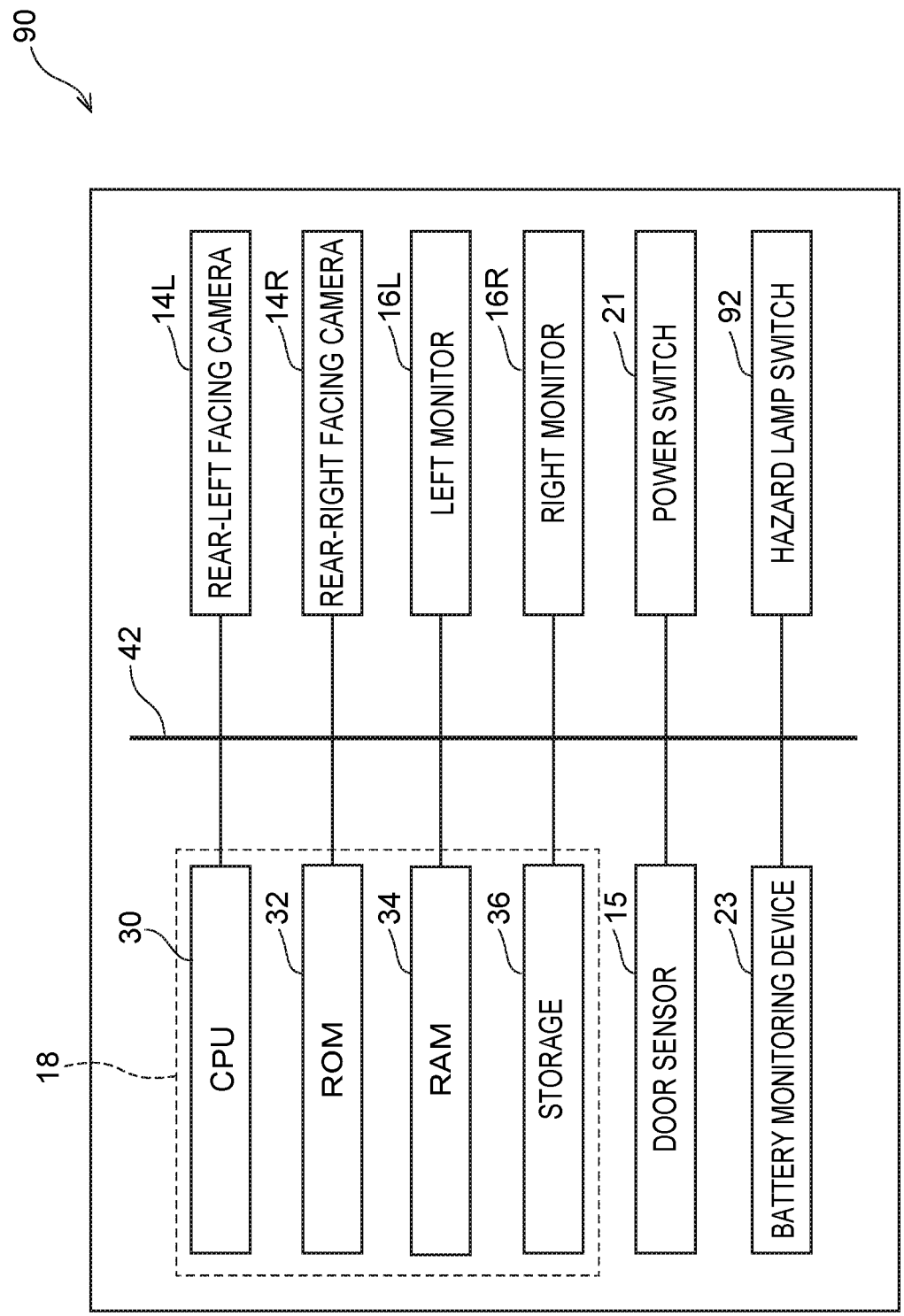
FIG. 8 is a block diagram illustrating a hardware configuration of a vehicle surroundings display device according to a third exemplary embodiment.
Figure 9:
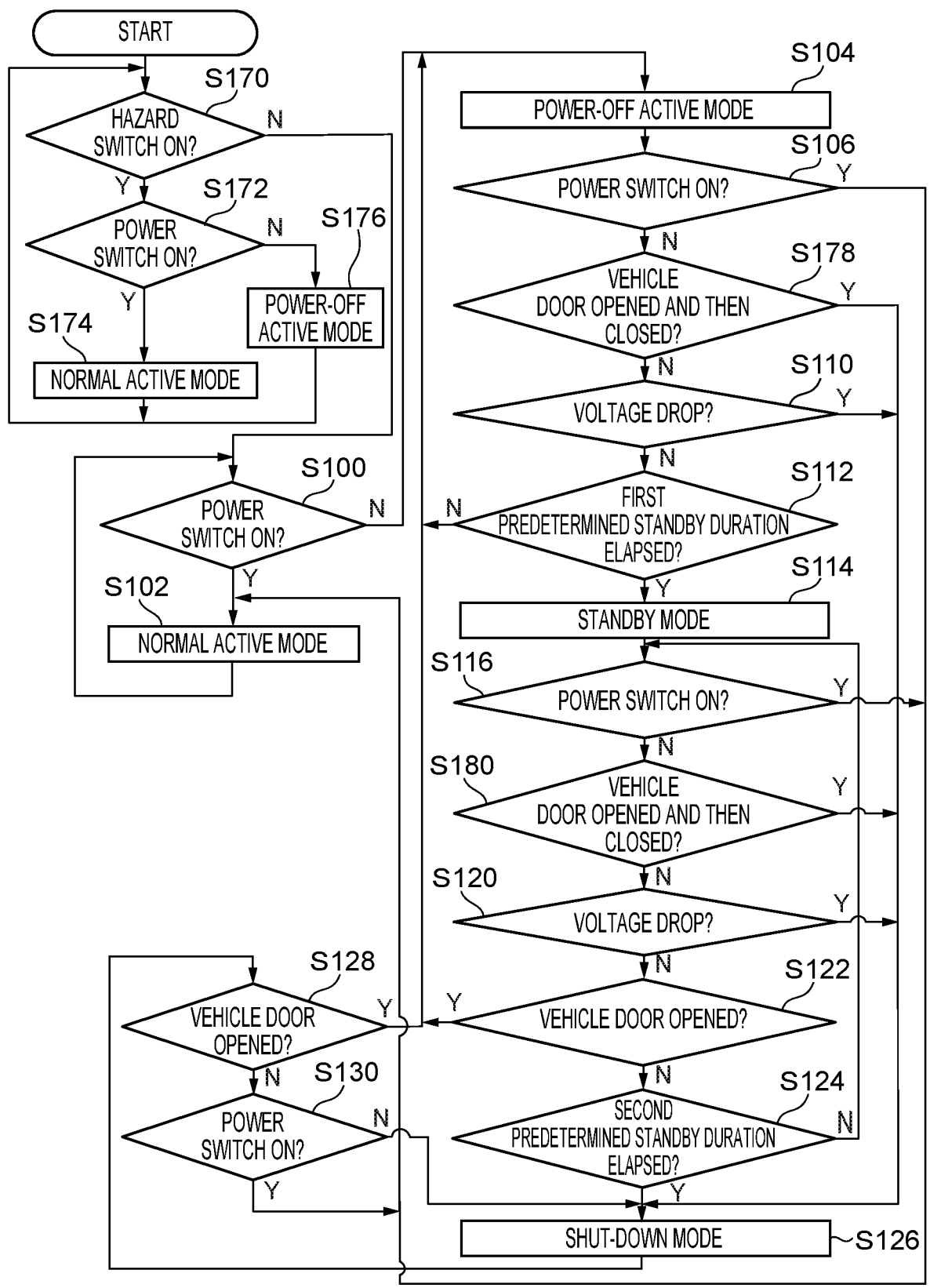
FIG. 9 is a flowchart illustrating a flow of operation of a vehicle surroundings display device according to the third exemplary embodiment.

Explanation follows regarding a vehicle surroundings display device according to a third exemplary embodiment of the present disclosure, with reference to FIG. 8 and FIG. 9. Note that configuration portions that are the same as those in the first exemplary embodiment and the like described above are appended with the same reference numerals, and explanation thereof is omitted.

A vehicle surroundings display device 90 according to the third exemplary embodiment has basically the same configuration as that of the first exemplary embodiment, and is provided with a feature of transitioning between modes according to an activation state of a hazard lamp and opening and closing of the vehicle door 13.

Hardware Configuration

As illustrated in FIG. 8, the vehicle surroundings display device 90 is configured including the CPU 30, the ROM 32, the RAM 34, the storage 36, the rear-left facing camera 14L, the rear-right facing camera 14R, the left monitor 16L, the right monitor 16R, the door sensor 15, the power switch 21, the battery monitoring device 23, and a hazard lamp switch 92 (see FIG. 1). These configuration elements are connected so as to be capable of communicating with each other through the bus 42.

The hazard lamp switch 92 is a switch for illuminating a non-illustrated hazard lamp of the vehicle 12. As an example as illustrated in FIG. 1, the hazard lamp switch 92 is provided at a vehicle width direction substantially central portion of an instrument panel 94 inside the vehicle cabin.

Functional Configuration

As illustrated in FIG. 3, functional configuration of the vehicle surroundings display device 90 includes the imaging section 46, the display section 50, a control section 96 serving as a controller, and the operation section 49. The various functional configuration is implemented by the CPU 30 of the control device 18 reading and executing a display control program stored in the ROM 32 or the storage 36 (see FIG. 8).

The control section 96 receives images captured by the imaging section 46, and outputs the received images to the display section 50. Namely, an image captured by the rear-left facing camera 14L is output to the left monitor 16L configuring part of the display section 50. Similarly, an image captured by the rear-right facing camera 14R is output to the right monitor 16R configuring another part of the display section 50.

The control section 96 receives an activation status of the power switch 21, voltage information regarding the auxiliary battery from the battery monitoring device 23, and an activation status of the hazard lamp switch 92, and selects activation states for the imaging section 46 and the display section 50 according to plural modes, based on the activation statuses and the voltage information.

The operation section 49 operates the imaging section 46 and the display section 50 according to the activation states selected by the control section 96.

Processing Flow

Explanation follows regarding operation of the vehicle surroundings display device 90. FIG. 9 is a flowchart illustrating a flow of operation by the vehicle surroundings display device 90. The CPU 30 reads the display control program from the ROM 32 or the storage 36 and expands and executes the program in the RAM 34 to display images. Note that similar processing to that in the first exemplary embodiment is allocated the same reference numerals and explanation thereof is omitted.

The CPU 30 determines whether or not the hazard lamp switch 92 is ON (step S170). In cases in which the hazard lamp switch 92 is ON (step S170: YES), the CPU 30 determines whether or not the power switch 21 is ON (step S172). In cases in which the power switch 21 is ON (step S172: YES) the CPU 30 operates the imaging section 46 and the display section 50 according to the normal active mode (step S174), and then repeats the processing from step S170. In cases in which the power switch 21 is OFF (step S172: NO), the CPU 30 operates the imaging section 46 and the display section 50 according to the power-off active mode (step S176), and then repeats the processing from step S170.

In cases in which the hazard lamp switch 92 is OFF at step S170 (step S170: NO), the CPU 30 determines whether or not the power switch is ON at step S100.

In cases in which the power switch 21 is not ON at step S106 (step S106: NO), the CPU 30 determines whether or not the vehicle door 13 is in a state of having been opened and then closed (step S178). In cases in which the vehicle door 13 is in a state of having been opened and then closed (step S178: YES), the CPU 30 determines that "there is a high possibility of the occupant having exited the vehicle", and operates the imaging section 46 and the display section 50 according to the shut-down mode (step S126). In cases in which the vehicle door 13 is not in a state of having been opened and then closed (step S178: NO), the CPU 30 determines that "the occupant has not exited the vehicle", and determines whether or not the auxiliary battery voltage has dropped to a predetermined voltage or lower (step S110).

In cases in which the power switch 21 has not been switched on at step S116 (step S116: NO), the CPU 30 determines whether or not the vehicle door 13 is in a state of having been opened and then closed (step S180). In cases in which the vehicle door 13 is in a state of having been opened and then closed (step S180: YES), the CPU 30 determines that "there is a high possibility of the occupant having exited the vehicle", and operates the imaging section 46 and the display section 50 according to the shut-down mode (step S126). In cases in which the vehicle door 13 is not in a state of having been opened and then closed (step S180: NO), the CPU 30 determines that "the occupant has not exited the vehicle", and determines whether or not the auxiliary battery voltage has dropped to the predetermined voltage or lower (step S120). Namely, shut-down conditions in power-saving processing by the control section 96 include a drop in the battery voltage, and "cases in which the vehicle door 13 has been opened and then closed at a time other than when the hazard lamp of the vehicle 12 is illuminated".

Operation and Advantageous Effects of Third Exemplary Embodiment

Explanation follows regarding operation and advantageous effects of the third exemplary embodiment.

With the exception of the fact that transitioning between modes is performed according to the activation status of the hazard lamp and opening and closing of the vehicle door 13, the above configuration is configured similarly to the vehicle surroundings display device 10 of the first exemplary embodiment, so obtains similar advantageous effects to the first exemplary embodiment. The predetermined shut-down condition in the power-saving processing performed by the control section 96 is a case in which the vehicle door 13 of the vehicle 12 has been opened and then closed at a time other than when the hazard lamp of the vehicle 12 is illuminated, thereby enabling the amount of power consumed to be effectively suppressed. Namely, in a state in which the vehicle door 13 has been opened and then closed while the hazard lamp is illuminated, the occupant has often only temporarily exited the vehicle, and so there is a high possibility that the occupant will return to the vehicle 12 relatively quickly. In contrast thereto, in a state in which the vehicle door 13 has been opened and then closed when the hazard lamp is not illuminated, there is a high possibility that the occupant has exited the vehicle and that their duration away from the vehicle 12 will be longer than if the hazard lamp were illuminated. Namely, in a state in which the vehicle door 13 has been opened and then closed and the hazard lamp is not illuminated, there is little need to activate the vehicle surroundings display device 90. Thus, transitioning to the shut-down mode without waiting for the first predetermined standby duration or the second predetermined standby duration in a state in which the vehicle door 13 has been opened and then closed and the hazard lamp is not illuminated enables the amount of power consumed to be effectively suppressed. This enables the auxiliary battery to be effectively protected.

In the first to third exemplary embodiments described above, determination is made that "the vehicle is unoccupied" and the control section 48, 76, 96 transitions to the shut-down mode in cases in which the vehicle door 13 has been locked from outside the vehicle, in cases in which the vehicle door 13 has been opened and then closed while the vehicle is stationary in a parking lot, or in cases in which the vehicle door 13 has been opened and then closed when the hazard lamp is not illuminated. However, there is no limitation thereto. Seating sensors may be provided to vehicle seats (neither of which are illustrated in the drawings) inside the vehicle, and transition made to the shut-down mode in cases in which the seating sensors have not detected any occupants sitting in the driver seat, or in any of the vehicle seats inside the vehicle. As an alternative to seating sensors, when transitioning to the shut-down mode, the presence of occupants in the vehicle may be detected using an ultrasound sensor or the like provided inside the vehicle to detect entry into the vehicle cabin.

Although the power unit in the exemplary embodiments described above is a hybrid system, there is no limitation thereto, and the power unit may be configured by an engine alone. In such cases, the power switch 21 corresponds to an ignition switch.

Although exemplary embodiments of the present disclosure have been described above, the present disclosure is not limited thereto, and obviously various other modifications may be implemented within a range not departing from the spirit of the present disclosure.

What is claimed is:

1. A vehicle surroundings display device comprising:
   an imaging device that images a region toward a rear side of a vehicle and sideways from the vehicle;
   a display device that is capable of displaying an image captured by the imaging device; and
   a controller that controls display of the display device by selectively adopting:
   a normal active mode in which the imaging device and the display device are in actuated states and the display device is in an image-displaying state when a power unit of the vehicle is in an actuated state,
   a power-off active mode in which the imaging device and the display device are in actuated states and the display device is in an image-displaying state when the power unit of the vehicle is in a shut-down state,
   a standby mode in which the imaging device and the display device are in actuated states and the display device is in a non-image-displaying state when the power unit of the vehicle is in the shut-down state, or
   a shut-down mode in which the imaging device and the display device are in shut-down states and the display device is in a non-image-displaying state when the power unit of the vehicle is in the shut-down state,
   wherein, in a case in which the power unit has been transitioned from the actuated state to the shut-down state, the controller performs:
   normal shut-down processing in which transition is made to the standby mode when a first predetermined standby duration has elapsed since transitioning to the power-off active mode, and transition is made from the standby mode to the shut-down mode when a second predetermined standby duration has elapsed;

first power-saving processing in which transition is made to the shut-down mode in cases in which a first predetermined shut-down condition has been satisfied within the first predetermined standby duration after having transitioned to the power-off active mode; or second power-saving processing in which transition is made to the shut-down mode in cases in which a second predetermined shut-down condition has been satisfied within the second predetermined standby duration after having transitioned to the standby mode.

2. The vehicle surroundings display device of claim 1, wherein the first predetermined shut-down condition in the first power-saving processing is a case in which a vehicle door has been locked from outside the vehicle.

3. The vehicle surroundings display device of claim 1, wherein the first predetermined shut-down condition in the first power-saving processing is a case in which a vehicle battery voltage has dropped to a predetermined voltage or lower.

4. The vehicle surroundings display device of claim 1, wherein the first predetermined shut-down condition in the first power-saving processing is a case in which a vehicle door of the vehicle has been opened and then closed when a current location of the vehicle is a predetermined location.

5. The vehicle surroundings display device of claim 1, wherein the first predetermined shut-down condition in the first power-saving processing is a case in which a vehicle door of the vehicle has been opened and then closed at a time other than when a hazard lamp of the vehicle is illuminated.

6. The vehicle surroundings display device of claim 1, wherein the controller performs activation processing to transition to the power-off active mode or the normal active mode within a predetermined duration in cases in which a predetermined activation condition is satisfied while in the shut-down mode or in the standby mode.

7. The vehicle surroundings display device of claim 6, wherein:
a first activation condition of the predetermined activation condition in the activation processing is a case in which the power unit of the vehicle has transitioned from the shut-down state to the actuated state; and
the controller performs activation processing to transition from the shut-down mode or the standby mode to the normal active mode in cases in which the first activation condition has been satisfied.

8. The vehicle surroundings display device of claim 6, wherein:
a second activation condition of the predetermined activation condition in the activation processing is a case in which a vehicle door of the vehicle has been opened; and
the controller performs activation processing to transition from the shut-down mode or the standby mode to the power-off active mode in cases in which the second activation condition has been satisfied.

* * * * *